Nov. 14, 1939.                P. MORRIS                2,179,514
                         SURVEYING INSTRUMENT
                       Filed March 22, 1938          2 Sheets-Sheet 1

Paul Morris
INVENTOR

BY Arthur L. Davis
ATTORNEY

Nov. 14, 1939.   P. MORRIS   2,179,514
SURVEYING INSTRUMENT
Filed March 22, 1938   2 Sheets-Sheet 2

Paul Morris
INVENTOR
BY Arthur L. Davis
ATTORNEY

Patented Nov. 14, 1939

2,179,514

UNITED STATES PATENT OFFICE 2,179,514

SURVEYING INSTRUMENT

Paul Morris, Chattanooga, Tenn.

Application March 22, 1938, Serial No. 197,422

2 Claims. (Cl. 33—72)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of surveying, particularly to a rapid means for conducting a preliminary traverse.

One of the objects of this invention is to provide an instrument which is suitable for reconnaissance, particularly over readily accessible terrain. Another object of this invention is to provide an instrument suitable for use in making numerous observations at successive stations in a short period of time. Still another object of this invention is to provide a rapid means for a preliminary survey of meandering roads and streams. Other objects of this invention include the provision of a means for rapid preliminary surveying, particularly suitable for making preliminary route surveys, by the use of gnomonics.

I have discovered a surveying instrument which comprises the combination of a vehicle with a passenger compartment and the necessary elements for determining the local mean sun time, the azimuth and the distance between stations.

In the accompanying drawings which form a part of the specification and wherein reference symbols refer to like parts whenever they occur, Fig. 1 is a rear view of the assembly mounted on the hood of an automobile as one form of apparatus for the embodiment of my invention.

Figure 1:
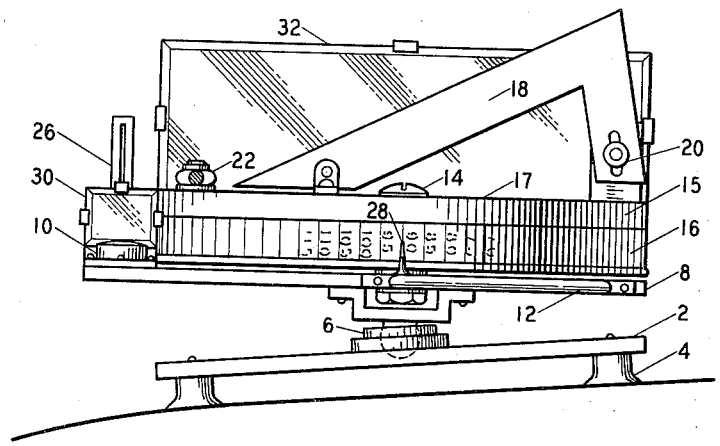
Figure 2:
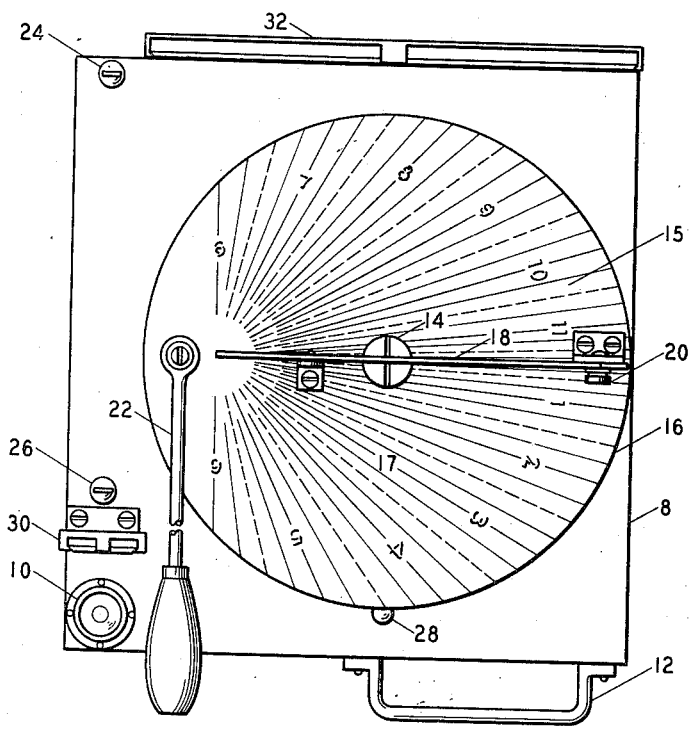
Fig. 2 is a plan view of Fig. 1.

In Fig. 1 and Fig. 2, a base 2 is provided with a plurality of suction cups, represented by suction cup 4. A ball and socket joint 6 connects the base 2 to a leveling plate 8, provided with a bubble level 10 and a leveling handle 12. A spindle 14, rigidly secured to the leveling plate 8, supports a cylindrical drum 15, provided with a peripheral azimuth band 16, graduated in 5 degrees and numbered from 0° to 360° clockwise and provided with a sun-dial face 17, graduated in 15 minute increments and numbered from 6 to 6 clockwise to correspond to shadow marks from 6 a. m. to 6 p. m. respectively, on its top. A gnomon 18 is mounted on the sun-dial face 17 of the revolving drum 15, with the vertical plane of the gnomon perpendicular to the face of the dial and in the plane of the noon shadow line and the zero azimuth mark. The gnomon 18 is provided with a clamp 20, for adjusting the angle of the gnomon to equal the degree of latitude of the locality in which the instrument is used. A drum handle 22 is pivotly secured to the drum 15, to permit revolving the drum from a remote position, such as the passenger compartment of the vehicle. A front sight 24 and a rear sight 26 are rigidly secured to the leveling plate 8, and are positioned so that when the 0° azimuth mark is opposite an indicator pin 28, affixed to the leveling plate 8, the 180° azimuth mark, the noon shadow mark, and the gnomon will be parallel to the sights. A small mirror 30 is provided for observing the position of the bubble in the bubble level 10, and a large mirror 32 is provided for observing the shadow cast by the gnomon when the sun is in back of the observer in the passenger compartment.

Figure 3:
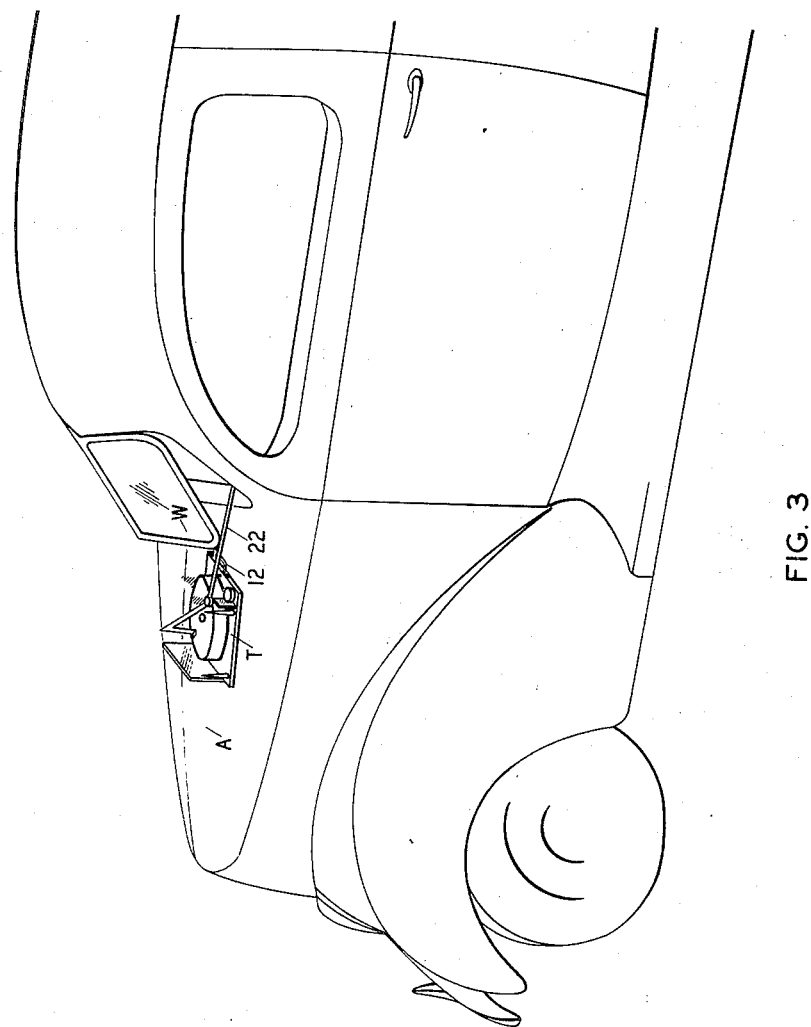
Fig. 3 is a perspective view of the apparatus shown in Fig. 1 and Fig. 2 shown in position for operation from the passenger compartment.

In Fig. 3 the assembly shown in Fig. 1 and Fig. 2 is shown as transit T mounted on the hood of an automobile A. The transit T is provided with a leveling handle 12, and a drum handle 22, for remote control from the passenger compartment through the windshield W which, in this case, is shown open for convenient access to these latter two elements. Where a vehicle which has a fixed windshield is used, the leveling handle 12, and the drum handle 22, are extended into the passenger compartment by suitable means which are well known but which are not shown.

One example for the operation of my invention is given for making a route survey. A vehicle is taken to a location where the azimuth of a line is known and the front and rear sights placed in alignment with that line. The leveling handle is moved until the leveling plate is level as shown by the reflection of the level bubble in the mirror in front of the bubble level. The drum handle is moved until the azimuth of the line is registered opposite the azimuth indicator pin. The angle of the gnomon is elevated above the dial to equal the degree of latitude of the locality of the line of known azimuth. An accurately regulated watch is then set to agree with the time indicated on the sun-dial in this position. A quick and final check of all adjustments of the instruments is then made by turning the base of the instrument 180°, resighting along the line with the sights reversed from the first position and setting the shadow on local mean sun time and observing the azimuth band opposite the azimuth indicator pin. The reading should be 180° from the true azimuth and should it differ more than 1°, the necessary adjustments are made and checked before using. The vehicle is then moved to the initial station. A foresight is taken on the next station, the instrument is leveled, the time from the previously set watch is read and the drum is rotated so that the shadow of the gnomon corresponds to the aforementioned time reading. The azimuth of the course between the initial station and the next station is read and the mileage reading of the speedometer on the vehicle is recorded. The vehicle proceeds to the next station and the operation just described is repeated until the entire route is traversed.

It is evident that there are numerous factors which will influence conditions for the most satisfactory operation of my invention the actual limits of which cannot be established except by a consideration of the course to be traversed, the vehicle used and the order of the survey.

Any vehicle suitable for traversing the course may be used. Such a vehicle will ordinarily have a passenger compartment or at least a location for a passenger or passengers from which the entire assembly may be operated.

The distance between stations may be read by any suitable means. When using an automotive vehicle, this is most conveniently accomplished by recording the observed speedometer reading at each successive station or by the use of an odometer. Where this is not practicable, such as in the case where an impassable obstruction exists between two stations, the distance between such stations may be determined by ordinary means, such as pacing, stadia or direct measurement. In running the course of a meandering stream, it will be necessary to use stadia in determining the distance between stations. This can readily be accomplished by supplanting the front and rear sight vanes with a telescope provided with stadia hairs. The operation of the telescope to make possible the stadia method of measuring distances is similar to the operation of the telescope on the well known telescopic alidade.

It will be seen, therefore, that this invention actually may be carried out by the use of various modifications and changes without departing from its spirit and scope, with only such limitations placed thereon as are imposed by the prior art.

I claim:

1. A surveying instrument which comprises the combination of a base adapted to be attached to a vehicle in front of a passenger compartment of said vehicle; a leveling plate pivotally supported by the base; a bubble level mounted on the leveling plate; a mirror in front of the bubble level adjusted to reflect the position of the level bubble into the passenger compartment; means for adjusting the leveling plate affixed to the plate and extending into the passenger compartment; a cylindrical drum on a spindle through its axis, and the lower end of the spindle rigidly affixed to the leveling plate, a sun dial face on the upper end of the drum, an adjustable gnomon above the sun dial face, and a peripheral azimuth band graduated from 0° to 360° clockwise; means for rotating the drum affixed to the drum and extending into the passenger compartment; an indicia for the azimuth band affixed to the leveling plate; a mirror in front of the drum adjusted to reflect the position of the shadow of the gnomon on the sun dial between the gnomon and the mirror into the passenger compartment; and a front sight vane and a rear sight vane affixed to the leveling plate at one side of the drum and both in visible alignment from the passenger compartment.

2. A surveying instrument which comprises the combination of a base adapted to be attached to a vehicle in front of a location for a passenger of said vehicle; a leveling plate pivotally supported by the base; a bubble level mounted on the leveling plate; means for adjusting the leveling plate; a cylindrical drum on a spindle through its axis, and the lower end of the spindle rigidly affixed to the leveling plate, a sun dial face on the upper end of the drum; an adjustable gnomon above the sun dial face, and a peripheral azimuth band graduated from 0° to 360° clockwise; means for rotating the same; an indicia for the azimuth band affixed to the leveling plate; and a front sight vane and a rear sight vane affixed to the leveling plate at one side of the drum and both in visible alignment from the location for a passenger.

PAUL MORRIS.